(12) United States Patent  
Kalkanoglu et al.

(10) Patent No.: US 7,861,478 B2
(45) Date of Patent: Jan. 4, 2011

(54) ROOF MEMBRANE AND ROOF SYSTEM USING THE MEMBRANE TO SIMULATE A STANDING SEAM METAL ROOF

(75) Inventors: Husnu M. Kalkanoglu, Swarthmore, PA (US); Stephen A. Koch, Collegeville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 355 days.

(21) Appl. No.: 11/928,234

(22) Filed: Oct. 30, 2007

(65) Prior Publication Data

US 2009/0107073 A1    Apr. 30, 2009

(51) Int. Cl.
*E04B 5/00*    (2006.01)

(52) U.S. Cl. .......................................... 52/410; 52/408
(58) Field of Classification Search ............... 52/408, 52/409, 410, 537, 538, 588.1, 551, 746.11; 428/40.1, 489, 490, 491; 442/48, 378, 258, 442/236, 298
See application file for complete search history.

(56) References Cited

U.S. PATENT DOCUMENTS

| | | | |
|---|---|---|---|
| 2,847,948 A | | 5/1955 | Truitt |
| 4,396,665 A | * | 8/1983 | Rowe .......................... 428/148 |
| 4,885,887 A | * | 12/1989 | Simmons et al. .............. 52/410 |
| 5,349,804 A | * | 9/1994 | Van Erden et al. ........ 52/746.11 |
| 5,572,843 A | * | 11/1996 | Jordan .......................... 52/410 |
| 5,711,116 A | * | 1/1998 | Hasan ............................ 52/58 |
| 6,230,461 B1 | * | 5/2001 | Piront .......................... 52/408 |
| 6,689,449 B2 | * | 2/2004 | Hasan et al. ................. 428/124 |
| 6,764,260 B1 | * | 7/2004 | Nebesnak et al. ............. 411/82 |
| 7,132,143 B2 | | 11/2006 | Zanchetta et al. |
| 7,430,837 B2 | * | 10/2008 | Hubbard ....................... 52/408 |
| 2003/0070391 A1 | * | 4/2003 | Tachauer et al. .......... 52/745.21 |
| 2004/0161570 A1 | * | 8/2004 | Zanchetta et al. ........... 428/40.1 |
| 2006/0099370 A1 | * | 5/2006 | Glass .......................... 428/40.1 |
| 2006/0243388 A1 | | 11/2006 | Kubiak et al. |

* cited by examiner

*Primary Examiner*—David Dunn
*Assistant Examiner*—Benjamin Pevarski
(74) *Attorney, Agent, or Firm*—Paul & Paul

(57) ABSTRACT

A roof membrane is disclosed, for use in simulating a standing seam metal roof when applied to a roof surface and a roof system is also provided, that employs the roof membrane, disposed between longitudinal, but spaced-apart, generally parallel roof battens. Underlayments of various constructions are also provided, beneath the membrane, as an option. Caps are provided for upstanding legs of the roof battens.

10 Claims, 4 Drawing Sheets

ROOF MEMBRANE AND ROOF SYSTEM USING THE MEMBRANE TO SIMULATE A STANDING SEAM METAL ROOF

BACKGROUND OF INVENTION

For centuries, metal has been used on all types of buildings to provide attractive roofing. Many high profile architectural buildings such as churches, government offices, museums, colleges and similar large buildings have used metal roofing, often as frequently as tiles and slate are used as roofing.

Among the available metals, copper has been used most frequently when the roof covering is metal. Reasons for a preferred use of copper as the metal, are because of the aesthetics, its durability, and its workability.

However, copper roofs are substantially expensive, largely due to material cost and the fact that the types of buildings on which copper roofs are applied generally involve very substantial surface areas for the roofs.

THE PRESENT INVENTION

Accordingly, the present invention provides an alternative roofing system, including a membrane, that, when installed on a roof, can provide the appearance of a copper roof without having the associated high cost. The present invention also provides the same benefit with respect to simulated metal roofs involving other metals.

SUMMARY OF INVENTION

The present invention therefore provides a novel membrane, for use in a roofing system to simulate a standing seam metal roof, with the membrane having a metal foil layer, a plastic film layer, and a bituminous material layer.

Preferably, the metal foil layer is disposed between and protected by the plastic film layer, and above the bituminous layer. The invention also involves a roof system comprising the membrane and an optional underlayment, with the roof system including a plurality of spaced-apart, generally parallel battens fastened to a roof and receiving a plurality of membrane strips therebetween.

Optionally, caps are provided over upstanding legs of the battens, both to provide a finished appearance, and to cover edges of the membrane strips that are against longitudinal surfaces of the battens.

Accordingly, it is a primary object of this invention to provide a novel roof membrane.

It is a further object of this invention to provide a roof system using the novel membrane of this invention, in strips, between longitudinally applied and spaced-apart battens on a roof.

Other objects and advantages of the present invention will be readily understood upon a reading of the following brief descriptions of the drawing figures, the detailed descriptions of the preferred embodiments, and the appended claims.

BRIEF DESCRIPTIONS OF THE DRAWINGS FIGURES

DETAILED DESCRIPTIONS OF THE PREFERRED EMBODIMENTS

Figure 1:
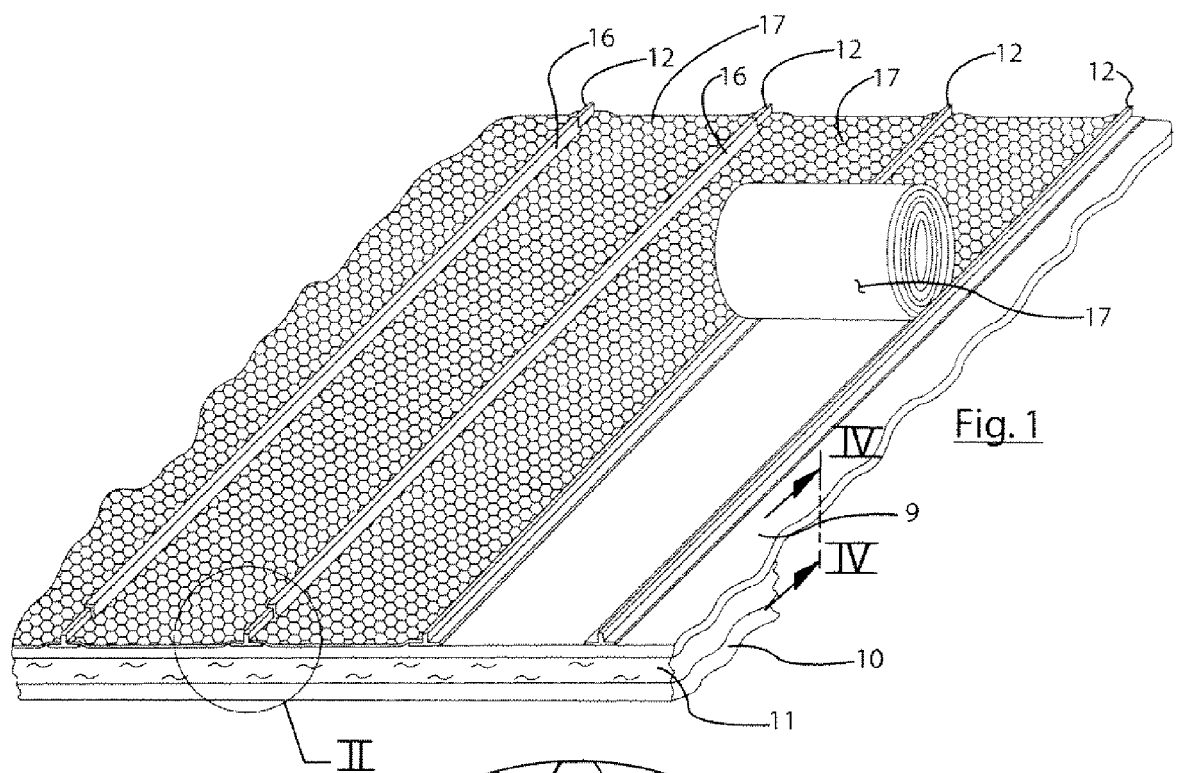
FIG. 1 is a fragmentary perspective view of a portion of a roof, with battens longitudinally applied thereto, in spaced-apart relation, and with strips of the membrane of this invention being applied between battens.

Referring now to the drawings in detail, reference is first made to FIG. 1, wherein a roof structure 10 is illustrated, covered with at feast one layer of insulation 11. The roof 10 may be constructed of plywood, pressed board or similar structural material. The insulation layer 11 may, for example, may be of the fiberglass type, if desired. It will be understood that more than one layer of insulation 11 may be used, as desired. Overtop the layer of insulation 11, there is provided an optional underlayment 9.

Figure 2:
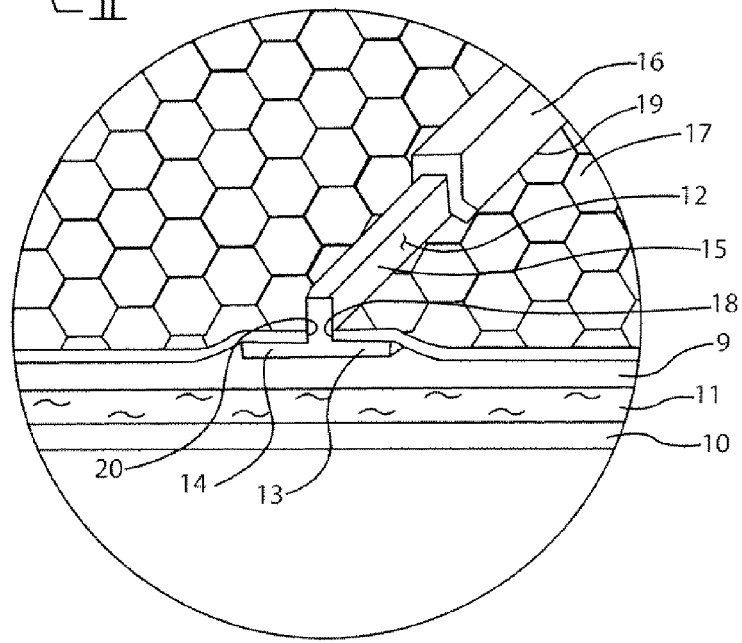
FIG. 2 is an enlarged fragmentary detail view of a batten and membrane strips on each side thereof, applied to the roof of FIG. 1, taken from the detail II of FIG. 1.

A plurality of longitudinally disposed, generally parallel spaced-apart battens 12 are provided, as shown in FIGS. 1 and 2, between which membrane 17 in the form of strips, can be applied between the battens, as shown. The membrane 17 will preferably be provided in rolls, as shown in FIG. 1.

The battens 12 will be fastened to the roof 10, through the optional underlayment 9, and any insulation layers 11 disposed therebeneath, by suitable fasteners, such as nails, staples, screws, or the like (not shown). Optionally, the battens 12 can be fastened to the underlying structures on the roof by means of adhesive, as desired. Preferably, the battens will be of extruded metal or plastic or polymer construction, and most preferably be in the form of an inverted "T", applied with two legs 13, 14 of the "T" onto the underlayment 9 or such underlying structure as may be present, leaving an upstanding leg 15 of the inverted "T", as shown. Alternatively, the batten could take on another shape that, optionally in combination with a cap strip, would result in the appearance of a standing seam. For example, an "L"-shaped angle iron, or a triangular shaped profile could be employed.

Caps 16 are applied over the upstanding legs 15 of the battens 12, as shown in FIG. 2. The caps 16 are generally in the form of an inverted "U"-shaped channel opposing legs of which are received against the side surfaces of the upstanding legs 15, as shown, and are frictionally or adhesively engaged therewith, to provide an aesthetic covering for the upstanding legs 15 of the battens, and to have lower edges 10 of the caps engaged against edges 18, 20 of the membrane strips 17, to lock those edges of the membrane strips against the legs 13, 14 of the battens. In some embodiments, the cap can cover a mechanical fastening means that holds the batten in place on the roof (not shown).

As shown in FIG. 2, it will be noted that portions of the membrane strips 17 overly the legs 13, 14 of the battens.

Figure 3:
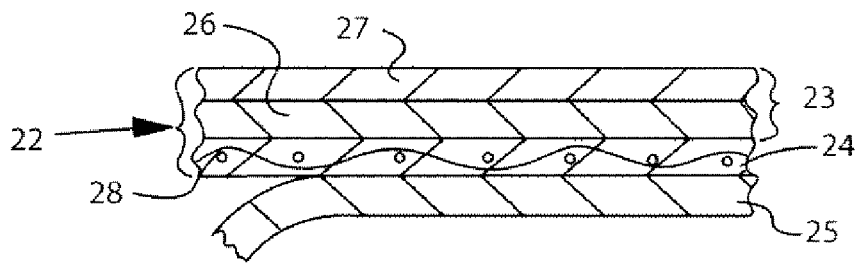
FIG. 3 is a fragmentary sectional view taken through a membrane in accordance with this invention.

With reference now to FIG. 3, the membrane 22 will be shown, as comprising preferably an upper layer 27 of plastic film, overlying and laminated to a metal layer 26 of foil. In some embodiments the upper layer 27 is a protective coating applied to the foil layer. The foil layer 26 will preferably be of copper foil, but where desired, other metals, such as tin, aluminum, steel or the like could be used in lieu of copper. Alternatively to a metal foil, a film or foil simulating or resembling metal may be used. In one embodiment a multi-layer polymer film with a metallic visual appearance generated by optical interference effects may be used to present a metallic appearance. In another embodiment, the upper portion of the membrane comprises a metallized or vapor coated polymer film. In yet another embodiment, a polymer film is employed that is pigmented with a metallic flake or pearlescent pigment system to provide the appearance of metal. The layer 26, whether of metal foil or simulated metal foil, will be referred to herein as metal-like. Beneath and laminated to layer 26, is a layer 24 that is preferably a bituminous layer with a self-adhesive bottom, containing an embedded reinforcement 28. The self-adhesive bituminous bottom layer may be a bitumen, a plasticizing oil, a tackifying resin, a stabilizer, or a thermoplastic polymer, or any other adhesive as may be desired. The reinforcement may be of any desired material, but typical such reinforcement materials would be fiberglass, polyester, polypropylene, woven or non-woven web, organic felt, scrim, paper or any combination of any of them.

Because, the bottom surface of layer 24 is of the self-adhesive type, preferably, a release layer 25 may be provided therewith, removable therefrom as shown at the left end of FIG. 3, prior to application of the bitumen layer 24 to a roof, or to an underlayment that is applied to a roof. The release layer 25 may be comprised of a silicone treated paper, a parchment, a plastic film, or any other suitable release layer that can readily be removed.

Figure 4:
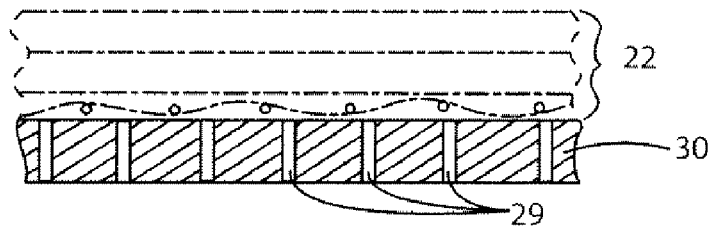
FIG. 4 is an illustration similar to that of FIG. 3, but wherein a membrane in accordance with FIG. 3 is illustrated in phantom, disposed over an underlayment having vent holes therein.

With reference now to FIG. 4, it will be seen that the membrane 22 shown in phantom, is adhesively applied to a base sheet 30 having a plurality of venting holes 20 therethrough, for facilitating the venting of air as the adhesive covered lower surface of the layer 24 is applied thereto.

Figure 4A:
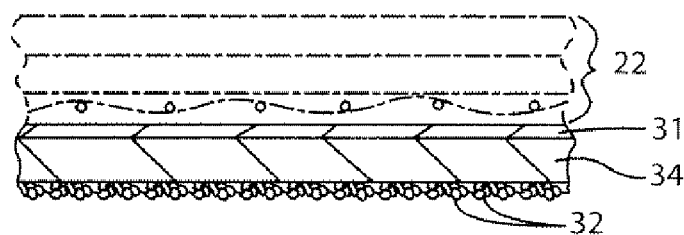
FIG. 4A is an illustration similar to that of FIG. 3, but wherein the membrane of FIG. 1 is illustrated in phantom, disposed over an underlayment that has a bitumen covered upper surface and a mineral surfacing on the bottom thereof.

Referring now to FIG. 4A, it will be seen that the membrane 22, shown in phantom, is laminated or adhesively applied to a base layer 34 which has a bare bitumen upper layer 31, to which the membrane is applied, and a mineral surfaced layer 32 therebeneath, comprising a plurality of very small mineral particles, such as granules, sand or the like.

Figure 4B:
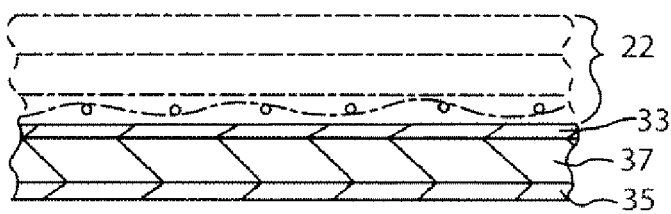
FIG. 4B is an illustration similar to that of FIG. 3, but wherein the membrane of FIG. 3 is illustrated in phantom, and wherein it is disposed over an underlayment having an upper plastic film surface, and a bottom surface covered by a film.

With reference now to FIG. 4B, another form of underlayment 37 is provided, having a base sheet, to which a plastic film 33 is laminated or adhesively applied on an upper surface, and a film 35 on its lower surface, which could also be of the self-adhesive type. The membrane 22, shown in phantom, is preferably adhesively applied to the plastic film 33.

Figure 4C:
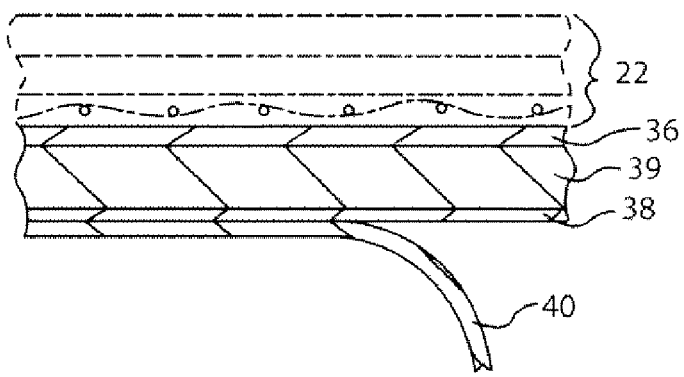
FIG. 4C is an illustration similar to that of FIG. 3, with the membrane illustrated in phantom, and wherein the underlayment has its upper surface covered with a plastic film, and its bottom surface having an adhesive thereon, with a removable release layer being shown, partially removed.

Referring now to FIG. 4C, yet another embodiment of the underlayment is illustrated, having a membrane 22 applied thereto, and shown, in phantom, with the base sheet 39 of the embodiment of FIG. 4C having a plastic film 36 laminated or adhesively applied to its upper surface, to which the membrane 22 is laminated or adhesively applied, and having an adhesive layer 38 therebeneath, to which a removable release layer 40 is applied to be removed prior to application of the underlayment with attached membrane shown in FIG. 4C, onto a roof.

Figure 5:
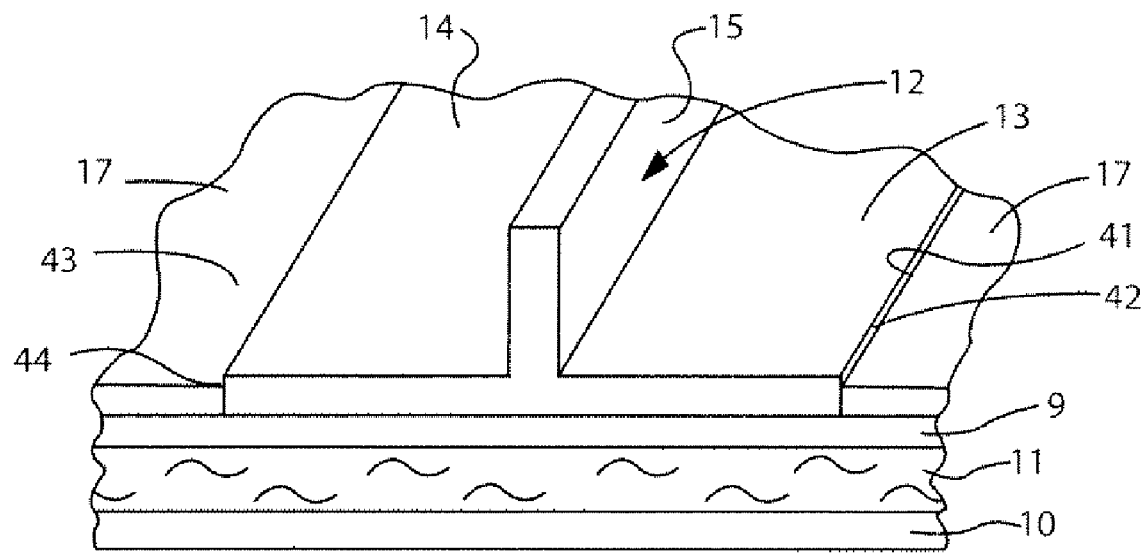
FIG. 5 is a fragmentary illustration of a portion of a roof having a batten thereon, similar to that of FIG. 2, but wherein the membranes on each side of the batten do not overly a portion of the batten, but rather terminate at edges of the batten.

Reference is now made to FIG. 5, wherein membrane strips 17 are shown, applied to an underlayment layer 9, that in turn, is applied over one or more layers of insulation 11, that in turn are applied to a roof 10. Edges 41, 43 of the membrane strips 17, in this embodiment, do not overly the legs 13, 14 of the batten 12, but rather abut against the longitudinal edges 42, 44, respectively of the batten 12, as shown. While not shown in FIG. 5, it will be understood that batten caps as described above may be provided over the upstanding legs 15 of the battens, as in FIG. 2.

Figure 6:
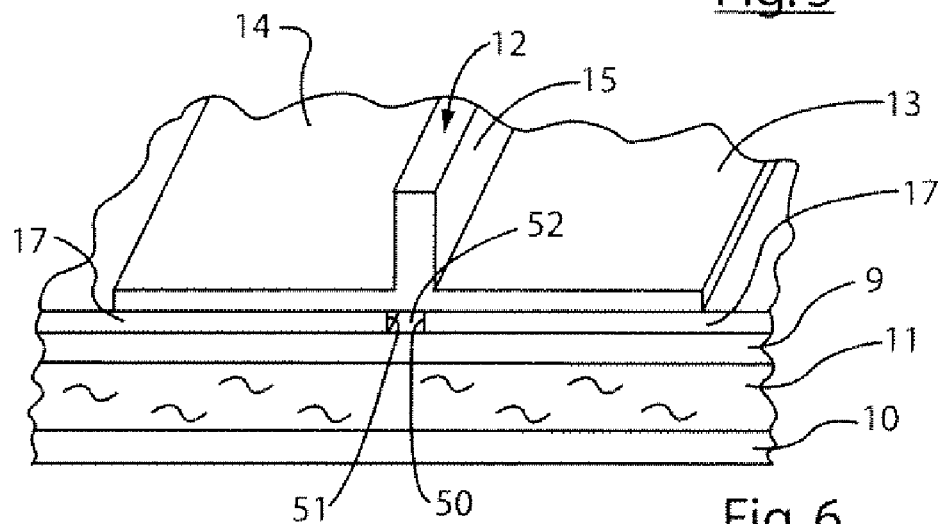
FIG. 6 is an illustration similar to that of FIG. 5, but where the membrane strips underly the batten.

With reference to FIG. 6, it will be seen that the roof 10, with its layer of insulation 11 thereon, has an underlayment layer 9, to which separate lays of membrane 17 are applied, with their facing edges 50 and 51 optionally having a space 52 therebetween, and with the batten 12 applied thereover. It will be understood that batten caps as described above may be provided over the upstanding, legs 15 of the battens 12. It will be seen that in the illustration of FIG. 6, the batten 12 conceals the opposed edges 50, 51 of the membranes 17.

Figure 7:
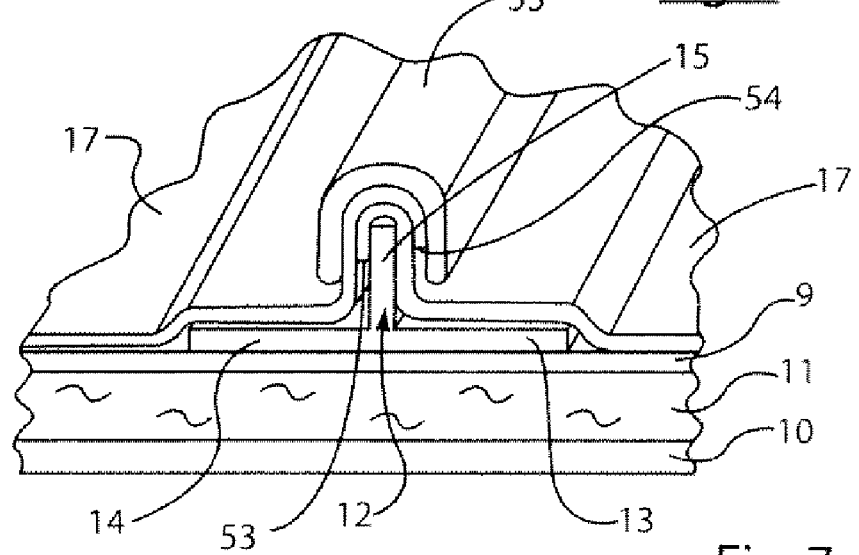
FIG. 7 is an illustration similar to that of FIG. 5, but where the membrane strips overly the batten, and overly the upstanding leg of the batten, with a cap thereon.

With reference now to FIG. 7, it will be seen that the roof 10, with its layer of insulation 11 thereon, has an underlayment layer 9 applied thereto, and that the batten 12 is disposed thereon. The membranes 17 on each side of the batten 12 pass up over the legs 13, 14, as shown and then up over the upstanding leg 15 of the batten 12, with the right most membrane overlying the upstanding leg 15 and terminating at an edge 53, and with the left-most membrane 17 terminating over the upstanding leg 15 of the batten 12, at an edge 54, as shown, and with an inverted "U" shaped cap 55 applied thereover, preferably snapping thereover to remain in place once installed. The cap 55 may be constructed of any suitable material, such as metal, polypropylene, or other plastic-like materials, as may be desired.

Figure 8:
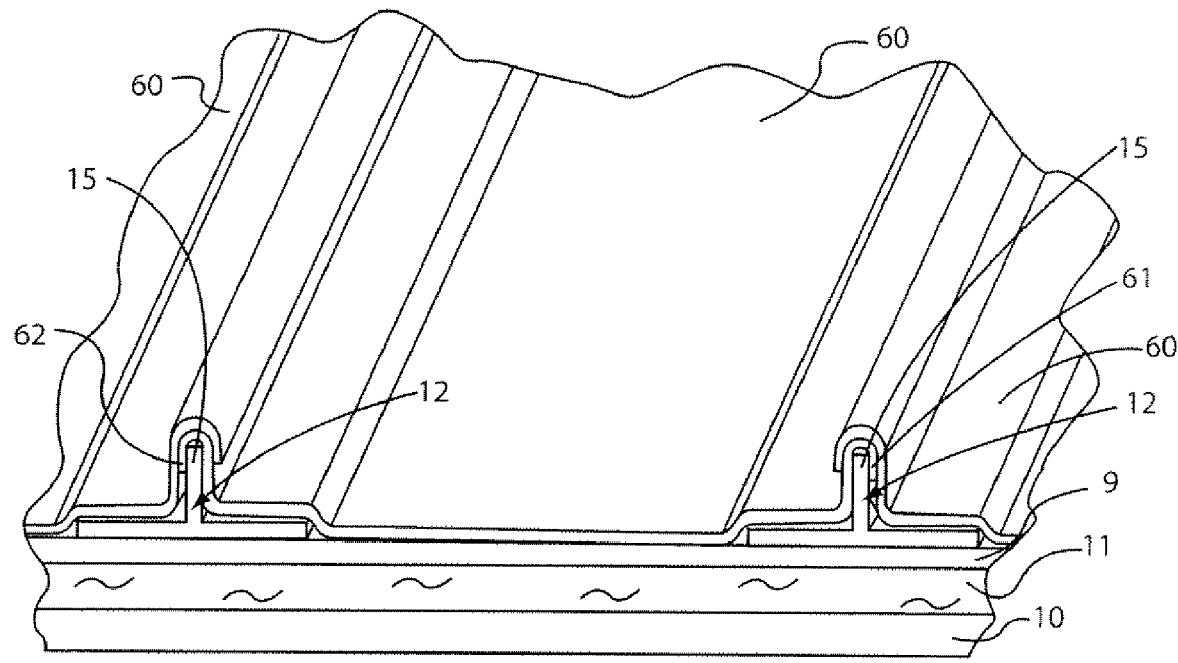
FIG. 8 is a fragmentary illustration, similar to that of FIG. 1, but wherein the membranes on each side of the batten overly the upstanding legs of adjacent battens forming their own caps over the upstanding legs.

With reference to FIG. 8, it will be seen that an alternative embodiment is provided, wherein the roof 10 has a layer of insulation 11 applied thereto, to which an underlayment layer 9 is provided, and wherein spaced apart battens 12 are applied, with a plurality of somewhat "U-shaped" membranes provided between adjacent battens 12, with spaced-apart lateral ends 61, 62 of the membrane 60 overlying the adjacent upstanding legs 15 of battens 12, as shown, and with adjacent strips of membrane 60 likewise overlying the upstanding legs 15 of the battens 12, in a double-overlying arrangement as shown in FIG. 8. In such an arrangement, it may be desired to avoid the application of caps, although applying caps thereover remains an option. The membrane 60, in each case could be comprised of polyvinyl chloride, with a metal cladding, an extruded polymeric sheet with a highly weather-resistant surface, or any other suitable material of construction. The membrane 60 could be comprised of a polymeric sheet having self-adhesive layers on its underside, to secure the same to the underlayment 9 and the battens 12, if desired. The membranes 60, could also, if desired, be constructed of a polymeric sheet comprising multiple layers, manufactured by a co-extrusion, or other process, all as may be desired.

Figure 9:
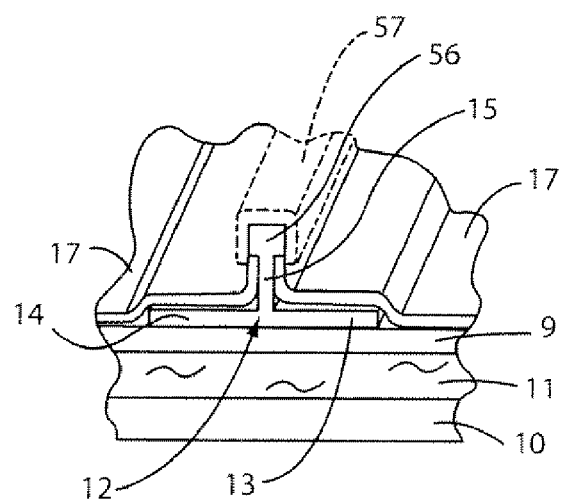
FIG. 9 is fragmentary illustration similar to that of FIG. 5, but wherein the upstanding leg of the batten has an enlarged upper end, against which edges of the membrane on each side are disposed, with a cap being shown in phantom thereover, as an optional feature.

Referring now to FIG. 9, it will be seen that, as with other embodiments, membrane strips 17 are applied to an underlayment layer 9, that in turn, is applied over one or more layers of insulation 11, that in turn are applied to a roof 10. The membrane strips 17, on each side of the upstanding leg 15, overly the respective legs 13, 14 of the batten, and then turn upwardly to be disposed against a transversely enlarged upper end 56 of the leg 15, as shown. An optional cap 57, shown in phantom, may overly the outer surfaces of the enlarged portion 56 of the leg 15, and may also overly the upper, upturned edges of the membranes 17 that are disposed against the enlarged portion 56 of the upstanding let 15, as shown.

It will be understood that various modifications may be made in the details of this invention, as well as in the manner in which it is applied to a roof, all within the spirit and scope of the invention as defined in the appended claims.

What is claimed is:

1. A roof system for use in simulating a standing seam metal roof when applied to a roof surface, comprising a plurality of spaced-apart, generally parallel longitudinal battens fastened to a roof, defining a plurality of membrane-receiving zones therebetween, and with strips of membrane disposed between the battens; wherein the membrane comprises a multi-layer laminate having a plurality of layers; with:
    (a) a first layer being a metal-like layer;
    (b) a second layer being a laminated film as a protective coating layer; and
    (c) a third layer being a bituminous layer,
wherein the battens are of generally inverted "T" shaped cross-section, comprising two legs of the "T" disposed against the roof and a third leg of the "T" being upstandingly disposed wherein longitudinal caps are provided having longitudinal slots therein, with the caps being disposed over the third legs of the "T"s so that the third legs of the "T"s are received in said slots.

2. A roof system for use in simulating a standing seam metal roof when applied to a roof surface, comprising a plurality of spaced-apart generally parallel longitudinal battens fastened to a roof, defining a plurality of membrane-receiving zones therebetween, and with strips of membrane disposed between the battens; wherein the membrane comprises a multi-layer laminate having a plurality of layers; with
    (a) a first layer being a metal-like layer;
    (b) a second layer being a laminated film as a protective coating layer; and
    (c) a third layer being a bituminous layer,
wherein the battens have upstanding legs and longitudinal edges of the membranes overlying the upstanding legs; with caps disposed over the longitudinal edges of the membranes and over the upstanding legs of the battens.

3. The roof system of any one of claims 1 and 2, wherein the bituminous layer has a bottom surface that is adapted to being applied to a roof surface and wherein said bottom surface has a self-adhesive property; wherein the membrane has a removable release layer on the bottom surface, adapted to being removed when the bottom surface of the bituminous layer is adhesively applied to a roof surface.

4. The roof system of claim 3, wherein the metal-like layer is disposed between the plastic film layer and the bituminous layer.

5. The roof system of claim 3, wherein the self-adhesive bituminous layer comprises any of:
    (a) bitumen;
    (b) plasticizing oil;
    (c) tackifying resin;
    (d) stabilizer; and
    (e) thermoplastic polymer.

6. The roof system of claim 3, wherein the release layer is selected from the group consisting of:
    (a) silicone treated paper;
    (b) parchment; and
    (c) plastic film.

7. The roof system of claim 3, wherein the bituminous layer includes a reinforcement.

8. The roof membrane of claim 7, wherein the reinforcement is embedded in the bituminous layer.

9. The roof system of claim 7, wherein the reinforcement is selected from the group consisting of:
    (a) fiberglass;
    (b) organic felt;
    (c) scrim;
    (d) paper; and
    (e) any combination of any of (a)-(d).

10. The roof system of claim 3, wherein the bituminous layer has a bottom surface that is adapted to being applied to a roof surface and wherein said bottom surface has a self-adhesive property; wherein the membrane has a removable release layer on the bottom surface, adapted to being removed when the bottom surface of the bituminous layer is adhesively applied to a roof surface, wherein the self-adhesive bituminous layer comprises any of:
    (a) bitumen;
    (b) plasticizing oil;
    (c) tackifying resin;
    (d) stabilizer; and
    (e) thermoplastic polymer,
wherein the release layer is selected from the group consisting of;
    (f) silicone treated paper;
    (g) parchment; and
    (h) plastic film,
wherein the bituminous layer includes a reinforcement, and wherein the reinforcement is selected from the group consisting of:
    (i) fiberglass;
    (j) organic felt;
    (k) scrim;
    (l) paper; and
    (m) any combination of any of (i)-(l).

* * * * *

UNITED STATES PATENT AND TRADEMARK OFFICE
CERTIFICATE OF CORRECTION

| | | |
|---|---|---|
| PATENT NO. | : 7,861,478 B2 | |
| APPLICATION NO. | : 11/928234 | |
| DATED | : January 4, 2011 | |
| INVENTOR(S) | : Husnu M. Kalkanoglu and Stephen A. Koch | |

It is certified that error appears in the above-identified patent and that said Letters Patent is hereby corrected as shown below:

Column 2 line 45, "feast" shoud read --least--.
Column 3 line 11, "10" should read --19--.
Column 3 line 57, "20" should read --29--.

Signed and Sealed this
Twenty-second Day of February, 2011

David J. Kappos
*Director of the United States Patent and Trademark Office*